United States Patent [19]

Bovellan et al.

[11] Patent Number: 5,653,495
[45] Date of Patent: Aug. 5, 1997

[54] REINFORCED DOOR APERTURE FRAME FOR REDUCING DEFORMATION FROM OFFSET COLLISIONS

[75] Inventors: Kent Bovellan; Jan Bengtsson, both of Trollhättan, Sweden

[73] Assignee: Saab Automobile Aktiebolag, Sweden

[21] Appl. No.: 397,204

[22] PCT Filed: Sep. 10, 1993

[86] PCT No.: PCT/SE93/00739

§ 371 Date: Mar. 10, 1995

§ 102(e) Date: Mar. 10, 1995

[87] PCT Pub. No.: WO94/06669

PCT Pub. Date: Mar. 31, 1994

[30] Foreign Application Priority Data

Sep. 11, 1992 [SE] Sweden ............... 9202619-4

[51] Int. Cl.$^6$ ............................................. B62D 25/08
[52] U.S. Cl. .................. 296/188; 296/30; 296/198; 296/204; 296/209
[58] Field of Search ............... 296/29, 30, 188, 296/193, 194, 198, 202–205, 209

[56] References Cited

U.S. PATENT DOCUMENTS

| | | | |
|---|---|---|---|
| 2,967,072 | 1/1961 | Wilfert et al. | 296/188 |
| 3,591,231 | 7/1971 | Wessels et al. | |
| 4,550,948 | 11/1985 | Hamada et al. | |
| 4,552,400 | 11/1985 | Harasaki et al. | 296/209 |
| 4,723,811 | 2/1988 | Harasaki. | |
| 4,944,553 | 7/1990 | Medley et al. | 296/188 |
| 5,042,872 | 8/1991 | Yoshii. | |
| 5,085,484 | 2/1992 | Mori. | |
| 5,246,264 | 9/1993 | Yoshii | 296/188 |
| 5,354,115 | 10/1994 | Esaki | 296/188 |

Primary Examiner—Dean Kramer
Attorney, Agent, or Firm—Ostrolenk, Faber, Gerb & Soffen, LLP

[57] ABSTRACT

An extra U-shaped pressed plate profile (20) is arranged at the connection (13) between the A-pillar (3) and sill (5), inside a closed hollow beam running around the door aperture, which plate profile runs from the front lateral wall of the A-pillar obliquely rearwards to the lower lateral wall of the sill beam, thereby providing a double wall with spaced plates (26, 27). The double wall enables a local plastic deformation zone to be provided for impact of the wheel against the door aperture frame, and enables the wheel to be locked so that it does not migrate up the A-pillar, thereby providing controlled deformation and absorption of crash forces without the entire door aperture frame collapsing. The rear plate (27) forms a secondary closed hollow beam inside the door aperture frame which, during the deformation of the front plate (26), retains a closed stable door aperture frame with adjoining sections of the A-pillar (3) and sill (5). Controlled deformation behavior, substantially reduced floor penetration and reduced deformation of the door aperture are obtained at low cost and little required increase in weight of the vehicle body.

8 Claims, 2 Drawing Sheets

REINFORCED DOOR APERTURE FRAME FOR REDUCING DEFORMATION FROM OFFSET COLLISIONS

BACKGROUND OF THE INVENTION

This invention relates to the reinforcement of a front side door aperture in motor vehicles aimed at reducing body deformations in the event of offset collisions.

Many studies have recently been devoted to the deformation resistance of motor vehicles in so-called offset collisions, particularly from the front. Offset collisions refer to collisions in which only a proportion, in most cases between 40-60%, of the front of the vehicle hits an object, in crash tests normally a concrete barrier or the like, thus only a proportion of the front section of the vehicle can be used as a deformation zone. Such collisions may totally destroy certain front structures, particularly if the front structure has been designed mainly to resist barrier crashes in which the entire front is involved in the deformation. If the offset collision is so minor that only a few per cent of the front of the vehicle hits the object, which means that the beams forming the front section are not involved, or are only involved to a small degree in the deformation work, the crash pulse extends to the wheel of the vehicle, which behaves largely as a non-deformable body during most of the initial phase of the deformation, at least until the deformation assumes such dimensions that the wheel is punctured. The crash pulse deforms the wheel suspension and the wheel is forced backwards towards the rear part of the wheel housing. Passenger cars are often designed so that the part of the wheel housing against which the wheel strikes forms part of the safety cage for the passengers, namely the A-pillar, by which is meant the front roof pillar and its extension down to the sill beam. The B-pillar consists of the pillar located behind the driver and front passenger door respectively.

When the crash pulse is propagated via the wheel to the bottom half of the A-pillar, at its connection to the sill, the door and the door aperture frame begin to be deformed and to absorb the crash forces. What designers try to ensure, in order to comply with stringent standards and safety requirements, is that the door aperture frame and the door are maintained intact as far as possible after the crash so that the doors can be opened, enabling the driver and passenger to leave the vehicle quickly.

One way of reinforcing the door frame is to accommodate the door frame in a stronger, and hence also heavier, structure. This is undesirable because the weight of the vehicle affects its petrol consumption. Another alternative may be to reinforce the door aperture frame in the area of the impact of the wheel, but this solution leads to a situation, in most cases, where the crash pulse is only propagated a small distance into the door aperture frame, with an attendant collapse further in along the sill. Another problem with this is that if the sill beam is made too stiff the wheel may begin to migrate up over the A-pillar during deformation of the front structure, which will begin to subject the A-pillar to buckling which may deform the entire door frame under much lower force stress.

SUMMARY OF THE INVENTION

The objective of the invention is to provide a reinforced door aperture frame which is partially able to act as a plastic deformation zone for the impacting of the wheel in the door aperture frame, particularly in the case of offset collisions, without the door aperture frame collapsing. By designing the connection between the lower end of the A-pillar and the front end of the sill beam with a double wall structure, with spaced plates, the first plate facing towards the wheel can serve as a first deformation element, thereby absorbing a proportion of the crash pulse before the deformation has progressed so far that even the plate located spaced and behind the first plate begins to be deformed. The double wall provides a longer deformation distance, with a stronger crash pulse, without the bottom half of the A-pillar beginning to act as a plastic element because of the deformation, and not as a stiff, force transmitting element as desired.

A further objective is to prevent the wheel from migrating up the A-pillar, exposing it to buckling. Because the rear plate is arranged inside the door frame and runs from the front lateral wall of the A-pillar obliquely downwards and rearwards to the lower lateral wall of the sill beam, the wheel is prevented from migrating up the A-pillar exposing it to buckling. This provides a certain controlled deformation of the lower half of the A-pillar without the door aperture frame losing its capacity to transfer loads to the rear structure of the body.

The foregoing and other objects are achieved in accordance with the present invention by a reinforcing plate which extends obliquely downwards and rearwards from a point adjacent to a front lateral wall of the A-pillar to the sill beam to form a double wall with the A-pillar which is substantially level with the center of the front wheel. The reinforcing plate has a front lateral wall which is spaced in the longitudinal direction from the front lateral wall of the A-pillar.

In a preferred embodiment, the reinforcement plate includes a back lateral wall so as to form a hollow beam with a closed profile, the hollow beam extending from an area on the A-pillar to an area on the sill beam, both areas being predetermined distances from the connection between the A-pillar and the sill beam.

To obtain the largest possible deformation zone, and secure locking of the wheel, preventing it from migrating up the A-stanchion, the reinforcement plate, in accordance with one aspect of the invention, extends downwardly at an oblique angle of substantially 45° to the horizontal.

A further objective is to provide the structure on the safety cage with increased deformation resistance with the least possible increase in weight. By allowing the structure forming the double wall to be constructed simply of one extra reinforcing plate, which is only positioned locally at the point of impact of the wheel against the A-pillar, a minimal weight increase is obtained. This object of the invention is achieved in accordance with another aspect of the invention by selecting the length of the reinforcement plate such that it is shorter than 50% of the length of the sill beam and shorter than 50% of the length of the A-pillar.

The weight can be kept down by also allowing the part of the ordinary hollow beam of the door aperture frame which does not face the point of impact of the wheel to form part of the secondary hollow beam formed by the extra reinforcing plate. This is achieved in accordance with another aspect of the invention by providing the reinforcing plate with a U-shaped profile and providing the front and back lateral walls of the reinforcing plate with flanged edges for connecting the reinforcing plate to the A-pillar.

Other features characterising the invention are indicated in the following description of an embodiment with reference to the attached figures. List of figures

DETAILED DESCRIPTION OF THE PREFERRED EMBODIMENT(S)

Figure 1:
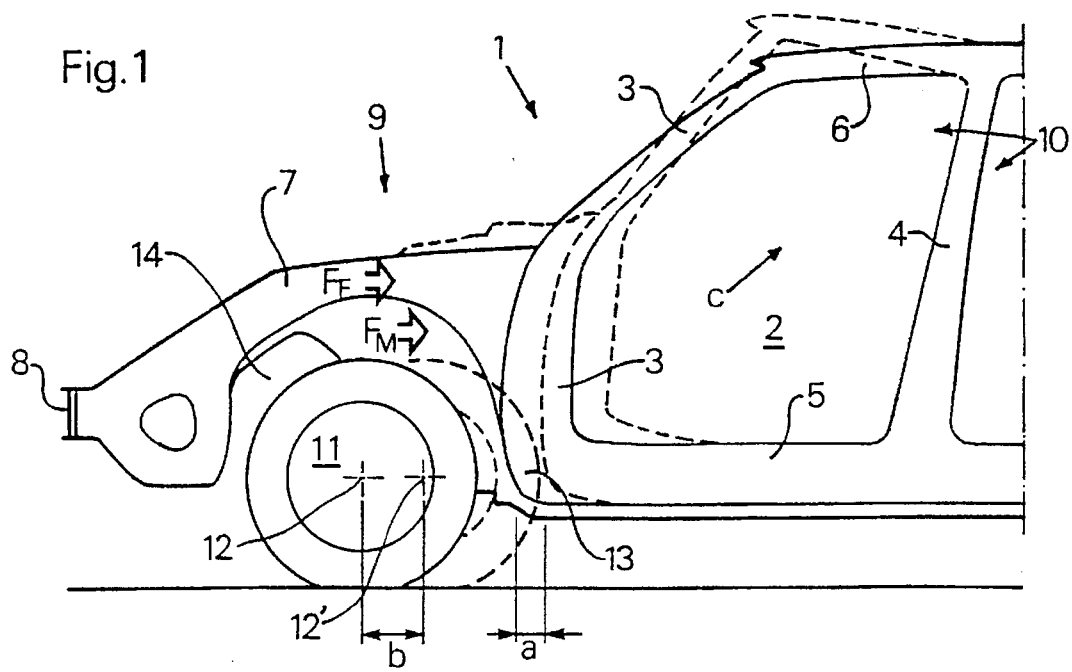
FIG. 1 shows one section of a motor vehicle, viewed from the side, in which the principles of how a shock pulse is propagated in the structure and deformation of the door aperture frame are shown.

FIG. 1 shows a front body structure of a passenger car 1. Motor vehicle 1 comprises an engine compartment 9 arranged in front of passenger compartment 10, in which engine compartment longitudinal front beams 7 are arranged for securing the engine unit and for stiffening the front structure for absorbing forces generated by frontal collisions. A bumper beam 8 is also arranged across the vehicle at the very front of the front beams. For improving the deformation resistance of the front structure still further a so-called subframe (not shown), on which the engine unit is mounted directly, may be secured to front beams 7. Such a subframe comprises cross beams which clamp together front beams 7 in the transverse direction. The purpose of a subframe is also to facilitate assembly and disassembly of the engine unit, since this type of subframe is mounted together with the engine unit from underneath and into the engine compartment 9.

Front side door aperture 2 is bounded in the longitudinal direction of the vehicle by a front pillar 3, referred to in the following as the A-pillar, and a rear pillar 4, referred to in the following as the B-pillar. At the bottom the door aperture is bounded by a sill beam 5 (referred to merely as sill in the following), and at the top by a roof beam 6. A- and B-pillars 3,4, sill 5 and roof beam 6 form a frame running round the door aperture, referred to in the following as door aperture frame 3–6. The door hinge is fastened in this frame, in most cases in A-pillar 3, but the door aperture frame also forms part of the safety cage around the passenger space. This safety cage must be kept intact as far as possible in the event of a crash to provide the passengers with the greatest possible chance of survival. If the safety cage is deformed, the distance to areas of impact for the passengers is reduced, thereby increasing the risk of injury. A wheel housing 14 accommodates one of the front wheels 11 of the vehicle, immediately in front of the safety cage, in the front structure of the vehicle.

Door aperture frame 3–6 consists conventionally of hollow beams or pillars with a closed profile, welded together by thin plates. The thin plates form lateral walls which run mainly parallel to the axial extension of each respective beam. A- and B-pillars 3, 4, sill 5 and roof beam 6 form a framework aperture running around the door aperture, in which the hollow beams are connected to each other at rigid nodal points. The plates of the A-pillar are extended downwards level with the lower edge of the sill beam, and the plates of the sill beam are extended forward to the front edge of the A-pillar so that they overlap each other. A rigid connection is formed at the nodal point between the lower end of the A-pillar and the front end of the sill beam in that the plates of the A-pillar are secured, in overlapping fashion, and preferably by spot welding, to the plates of the sill beam. Correspondingly rigid connections are obtained at all other nodal points, thereby providing a stiff, deformation resistant door aperture frame of low weight. This frame is able to absorb considerable forces as long as the nodal points or the beams do not collapse.

FIG. 1 shows, in the form of dashed lines, what happens to the wheel and the door aperture frame in the event of an offset collision or an extreme barrier crash. After the initial stage of the crash, when the sections in front of wheel i1 have been deformed, the safety cage is subjected to forces from front beams 7, $F_f$, and from the engine unit $F_m$. When the deformation has progressed to such a stage that the suspension of wheel 11 has also been deformed, so that wheel 1i strikes connection 13 between the front end of sill 5 and the lower end of A-pillar 3, the safety cage is also subjected to forces from the wheel. The impact of the wheel against the safety cage gives rise to a considerable point load, particularly against the connection between the A-pillar and sill, which connection will therefore be that part of the door aperture frame which risks collapsing first. Wheel 11 has a limited degree of deformation on impact against connection 13, and after limited deformation of wheel 11, wheel 11 acts as a rigid body until the deformation of front section has progressed to such an extreme degree that the wheel is punctured or even explodes.

During the interaction of forces $F_f$ and $F_m$ and wheel 11, door aperture frame 3–6 is subjected to diagonal compression, marked c in the figure. The deformation which the door aperture frame undergoes is denoted by dashed contours. Wheel ! ! is forced back a distance b so that its wheel centre 12 is displaced to 12'. The front edge of door aperture frame 3–6 is then displaced a distance denoted by a in the figure. Distance a is shorter than displacement b of wheel centre 12–12' because the wheel has a certain clearance in front of connection 13 between the lower end of the A-pillar and the front end of sill 5. To a certain extent the deformation is reduced by the door arranged in the door aperture, which transmits forces mainly from the rear edge of the A-pillar to the front edge of the B-pillar. But if diagonal deformation c is excessive the door is clamped tight and cannot be opened, which happens if the door aperture frame collapses and loses its force distributing capacity.

The deformation caused by wheel 11 may result in considerable floor penetrations into the safety cage, and if the connection 13 between A-pillar 3 and sill 5 is deformed, its load absorbing and load distributing capacity are also lost, with the result that the door aperture frame will collapse.

Figure 2:
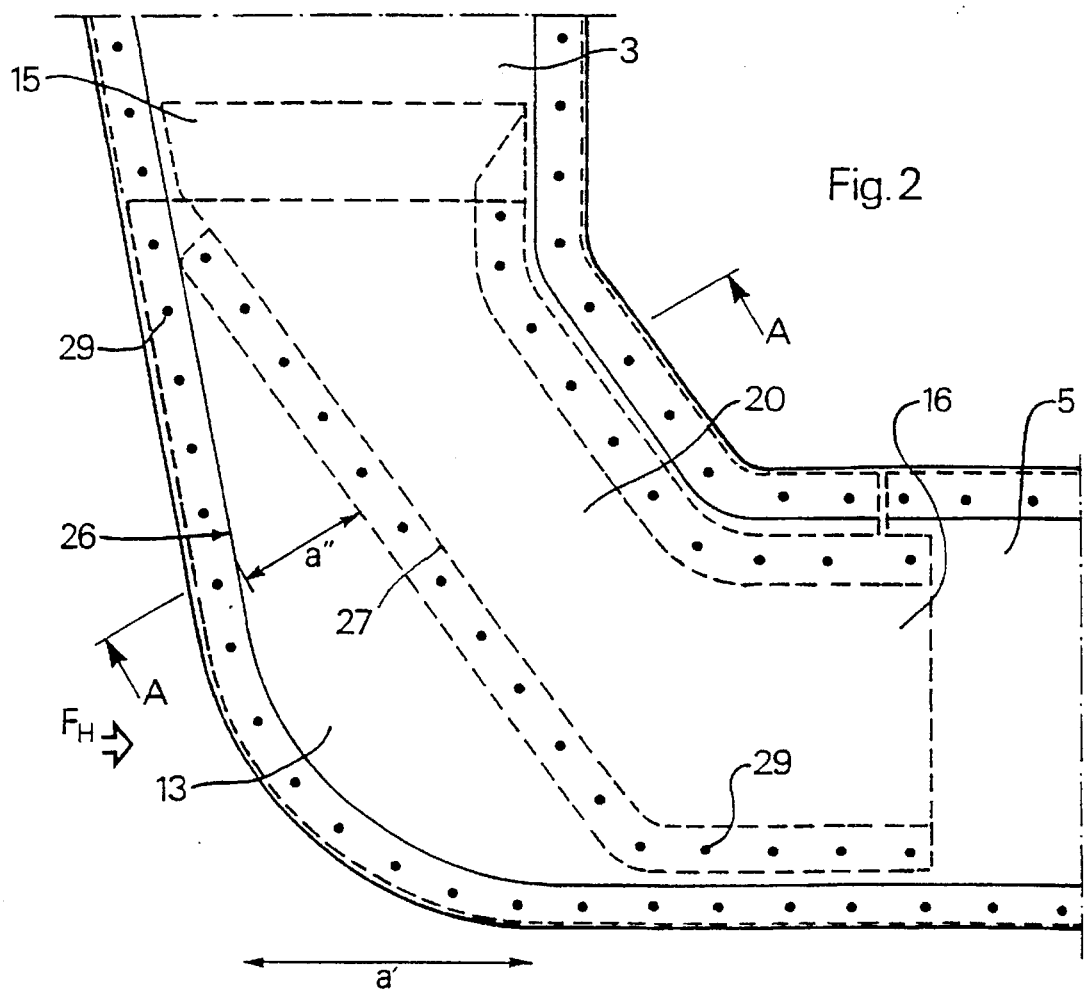
FIG. 2 shows a vertical section of the lower half of the door aperture frame between the A-pillar and the sill, with a mounted reinforcing plate according to the invention.
Figure 3:
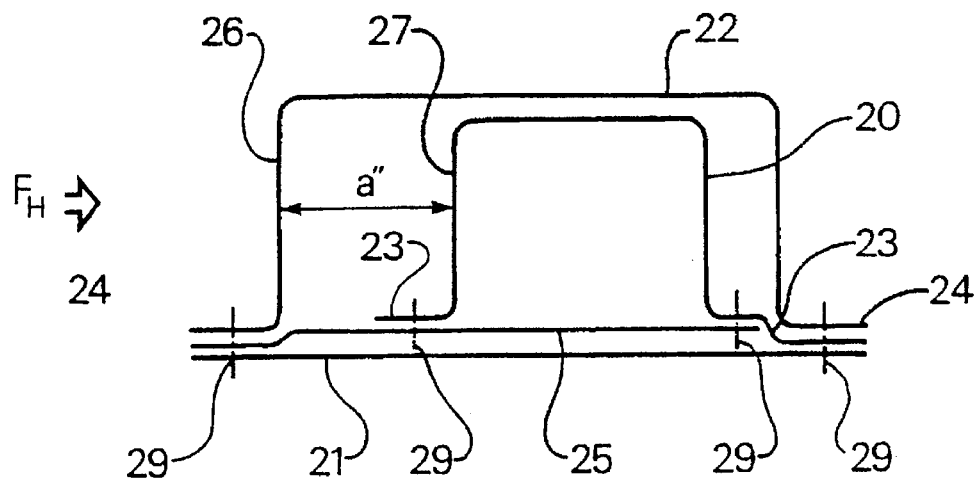
FIG. 3 shows a section viewed along A—A in FIG. 2.
Figure 4:
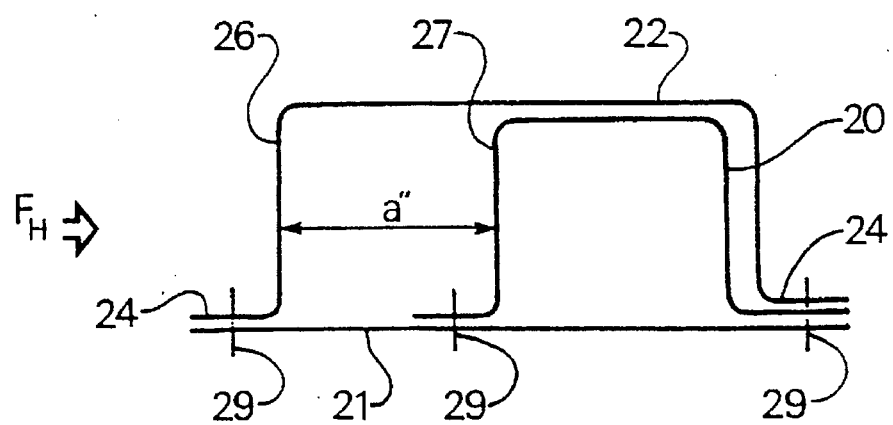
FIG. 4 shows an alternative section viewed along A—A in FIG. 2.

FIGS. 2–4 show an embodiment of the reinforcement according to the invention of connection 13 between the lower end of A-pillar 3 and the front end of sill 5. FIG. 2 shows an enlarged section of connection 13, in which the closed hollow beam of the door aperture frame has been provided with an extra reinforcing plate 20, which, when secured to the hollow beam of the door aperture frame, also forms a double wall in the longitudinal direction of the vehicle, with a distance a', spaced plates 26, 27 level with wheel centre 12 of the front wheel, in the lower front section of the A-pillar. Reinforcing plate 20 is arranged inside the door frame and runs from the front lateral wall of the A-pillar obliquely downwards and rearwards to the lower lateral wall of the sill beam. Wheel centre 12 is level with the direction of application of the force from the wheel impact, $F_h$, this direction being denoted by an arrow in FIG. 2. Reinforcing plate 20 is secured to door aperture frame 3–6 so that reinforcing plate 20 forms a second hollow beam with a closed profile. This second hollow beam extends from an area 15 in A-pillar 3 to an area 16 in sill 5. Both these areas 15, 16 are located at a distance from the connection between the A-pillar and sill, a distance which is less than half the length of the A-pillar and sill respectively. In order to reduce the weight of the reinforcement, reinforcing plate 20 need only extend into the A-pillar and sill for a distance required to form the double wall. This minimum distance may amount to 10–20% of the length of sill 5 and A-pillar 3.

Because reinforcing plate 20 runs internally from the front lateral wall 26 of the A-pillar obliquely downwards and rearwards to the lower lateral wall of the sill beam, the wheel is prevented from migrating up the A-pillar as soon as front lateral wall 26 begins to be deformed because of direct impact from the wheel. The locking effect of the wheel will be proportional to the degree of deformation of front lateral wall 26, and the reinforcing plate later contributes to ensuring that the wheel is forced favourably downwards relative to the sill beam when the deformation has progressed to such a degree that front lateral wall 27 of reinforcing plate 20 is affected by the wheel impact.

Front lateral wall 27 of reinforcing plate 20 should preferably lie in a plane forming an angle of about 45 degrees to the horizontal plane. This applies to hollow beams in the A-pillar and sill with similar dimensions. Where the hollow beams in the A-pillar have a larger cross-section than those in the sill, in the longitudinal direction of the vehicle, the angle can be made smaller. Conversely if the sill beam has a larger cross-section viewed in the longitudinal direction of the vehicle, the angle can be made larger. This provides the largest possible deformation zone at wheel impact level, whilst retaining a rear secondary hollow beam of adequate dimensions.

FIG. 3 shows a first advantageous embodiment and the structure of connection 13 in a cross-section A—A shown in FIG. 2. The hollow beam of the door aperture frame is formed by a flat cover plate 21 facing towards the interior of the vehicle, which plate seals a trough-shaped pressed plate 22 so that a closed hollow beam is formed. Trough-shaped plate 22 is provided along its edges with folded out flanges 24, to which flanges cover plate 21 is secured by means of closely arranged spot welds 29 (marked by a cross in the figure). Arrow $F_h$ shows the direction of impact of the wheel against the door aperture frame. In accordance with the invention the door aperture frame is provided with a reinforcing plate 20 arranged inside the door aperture frame, which plate is also trough-shaped with folded out flanges 23 along its edges.

In this embodiment a plate 25 is extended upwards from sill 5 into the A-pillar. Reinforcing plate 20 is secured by spot welds to this plate 25 along its flanges 23. This forms not only the primary hollow beam of door aperture frame 3–6, formed by plates 21, 22, but also a secondary hollow beam, formed by plates 20, 25, which secondary hollow beam runs parallel with, but displaced back inside, the primary hollow beam. In connection 13 the new reinforcement forms a stable, closed section inside the existing section. Because the secondary hollow beam is displaced backwards a distance a", a' in FIG. 2, from the front of the door aperture frame and the side directed toward the point of impact of the wheel, the door aperture frame at connection 13 may be deformed a distance a" before there is risk of the hollow profile running round the door aperture frame collapsing. The double wall formed by the reinforcing plate (20) locally, level with and directed toward the wheel centre (12), leaves a distance (a', a") equivalent to at least 20% of the cross-section of the door aperture frame formed locally in the area. Using a reinforcing plate with much thicker plate than the hollow beam, which can provide the secondary hollow beam with sufficient stiffness, the distance and hence the plastic deformation zone can be correspondingly increased.

The embodiment shown in FIG. 3 allows a certain amount of controlled buckling of the bottom of trough-shaped plate 22 and cover plate 21 to take place in the transverse direction of the vehicle in the area of the double wall without deformation of the rear secondary hollow beam.

FIG. 4 shows an alternative embodiment in which connection 13 can be constructed in a cross-section A—A, shown in FIG. 2. Here plate 25, extending from sill 5 as shown in FIG. 3, has been omitted, and instead extra reinforcing plate 20, with a pressed trough-shaped profile, is secured with its flanges directly to cover plate 21. This may be a simpler structure from the point of view of production.

Both embodiments in FIGS. 3 and 4 show that the reinforcing plate is arranged inside the door aperture free. This is advantageous from the point of view of corrosion because there are no extra visible joints on the outside of sill 5 or A-pillar 3, which joints could otherwise provide a basis for rust attack.

Another embodiment (not shown) may include a reinforcing plate arranged on the outside of the door aperture free, instead of a reinforcing plate located inside the free. In this case the ordinary door aperture frame forms the rear plate angled obliquely downwards, in a functionally equivalent manner, in the area of connection 13. In this variant an extra U-shaped plate profile is threaded on to the door aperture frame from the direction of impact of the wheel, with the bottom of the U-profile facing the wheel. This extra U-shaped plate profile can be fitted locally at connection 13 so that a double wall is formed by the bottom of the extra plate profile and the plate side of the door aperture frame facing the wheel, spaced the required distance equivalent to a', a". However, this may be less advantageous from the point of view of corrosion since the edges on the extra reinforcing plate will be visible and exposed to rust attack.

The door aperture frame in the area of the double wall structure may possibly be provided with a slightly larger section at connection 13. The enlarged cross-section may suitably be directed with its increase in section towards the centre of wheel 1i, thereby allowing an increase in the plastic deformation zone a', a".

In tests on a door aperture frame of a type equivalent to that used on cars of the type SAAB 9000, in which the door aperture frame is manufactured from 0.8 mm plate, and with an extra reinforcing plate 1.2 mm thick, major improvements were achieved in terms of door aperture deformation and floor penetration in offset collisions. The deformation of the door aperture was reduced by over 80%, which clearly indicates that the door aperture frame avoided collapse, and the floor penetration was reduced by over 50%.

The invention is not restricted to covered car bodies but may also be applied to open cars, so-called cabriolet cars, in which roof beam 6 is omitted.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A reinforced door aperture frame for a front side door aperture in a motor vehicle having a wheel housing for a front wheel located between the front of the vehicle and the door aperture, which door aperture frame comprises:

a front, substantially vertical A-pillar connected at the bottom thereof to a substantially horizontal sill beam, the A-pillar comprising a first hollow beam having a closed profile with a front lateral wall extending transversely of a longitudinal direction of the vehicle; and a reinforcing plate extending obliquely downwards and rearwards from a point adjacent to the front lateral wall of the A-pillar to the sill beam to form a double wall with the A-pillar which is substantially level with the center of the front wheel, the reinforcing plate having a front lateral wall which extends transversely of the longitudinal direction of the vehicle and which is longitudinally spaced from the front lateral wall of the A-pillar, the reinforcement plate including a back lateral wall to form a second hollow beam with a closed profile, the second hollow beam extending from an area on the A-pillar to an area on the sill beam, both areas being predetermined distances from the connection between the A-pillar and the sill beam.

2. A reinforced door aperture frame according to claim 1, wherein the second hollow beam extends downwardly at an oblique angle of substantial 45° to the horizontal.

3. A reinforced door aperture beam according to claim 2, wherein the second hollow beam is open at its ends and has a length which is shorter than 50% of the length of the sill beam and shorter than 50% of the length of the A-pillar.

4. A reinforced door aperture frame according to claim 2, wherein the reinforcing plate has a U-shaped profile and the front and back lateral walls of the reinforcing plate have flanged edges for connecting the reinforcing plate to the A-pillar.

5. A reinforced door aperture frame according to claim 2, wherein the double wall formed by the reinforcing plate which is level with the center of the wheel is spaced from the front lateral wall of the A-pillar by an amount equal to at least 20% of the width of the front lateral wall of the A-pillar.

6. A reinforced door aperture frame according to claim 1, wherein the second hollow beam has a smaller cross-sectional area than the first hollow beam and is positioned within the first hollow beam.

7. A reinforced door aperture frame according to claim 6, wherein the A-pillar, the sill beam and the reinforcing plate are formed of plate materials of given thicknesses, the thicknesses of the plate materials forming the A-pillar and the sill beam being equal and the thickness of the reinforcing plate being at least equal to the thicknesses of the plate material forming the A-pillar and the sill beam.

8. A reinforced door aperture according to claim 7, wherein the thicknesses of the plate material forming the A-pillar and the sill beam are each approximately 0.8 mm and the thickness of the reinforcing plate is approximately 1.2 mm.

* * * * *